United States Patent [19]

Hu

[11] Patent Number: 4,956,924
[45] Date of Patent: Sep. 18, 1990

[54] GAUGE DEVELOPER

[76] Inventor: Ming C. Hu, No. 1, Lane 109, Ta Kuang Road, Sec. 2, Pan Chiao City, Taipei Hsien, Taiwan

[21] Appl. No.: 306,748

[22] Filed: Feb. 6, 1989

[51] Int. Cl.$^5$ .............................................. G01B 5/20
[52] U.S. Cl. .................................. 33/561.1; 33/21.3; 33/562
[58] Field of Search ................. 33/175, 176, 21.3, 562, 33/563, 529, DIG. 1, 669, 347, 561.1, 561.3

[56] References Cited

U.S. PATENT DOCUMENTS

| | | | |
|---|---|---|---|
| 2,222,127 | 11/1940 | Turner | 33/529 X |
| 2,742,706 | 8/1953 | Rushing, Jr. | |
| 3,196,548 | 7/1965 | Moore | 33/DIG. 1 X |
| 3,416,235 | 12/1968 | Spilker | 33/DIG. 1 X |
| 4,291,467 | 9/1981 | Shultz | 33/DIG. 1 X |
| 4,807,369 | 2/1989 | Ming-Chin | |

FOREIGN PATENT DOCUMENTS

| | | | |
|---|---|---|---|
| 186469 | 6/1907 | Fed. Rep. of Germany | 33/175 |
| 2917051 | 11/1980 | Fed. Rep. of Germany | 33/175 |
| 665750 | 5/1929 | France | 33/175 |

*Primary Examiner*—Harry N. Haroian
*Attorney, Agent, or Firm*—Wenderoth, Lind & Ponack

[57] ABSTRACT

A gauge developer has both sides of a flexible strip formed with even surfaces, and the strip itself is provided with magnetic substances or provided on one side with a coating of a magnetic sheet. Pin holder portions are recess holes formed by one surface of the strip being caved in along the thickness direction toward the other side where pins, upon insertion in the holes, are held in position by the friction of the hole walls and magnetic force from the magnetic layer, thereby allowing the pins to be maintained in position during use. Several gauge developers may be compactly placed together, one above the other, in a block form for use in gauging the contour or surface of any body having a concavo-convex surface.

10 Claims, 3 Drawing Sheets

GAUGE DEVELOPER

BACKGROUND AND SUMMARY OF THE INVENTION

The present invention relates to a gauge developer and more particularly, to an improved gauge developer suitable for use in the sheet-metal work of pipes and tubes to enable workmen to easily record a development elevation of an object by gauging the object at a job site.

In the sheet-metal work of delivery pipes, exhaust pipes and the like, when there is a necessity to plot a development elevation of a complicated pattern in the design and drawing office, this is generally performed by following mechanical drawing or computer plotter techniques and by using instruments in order to obtain the precise developed patterns. It is difficult, however, to acquire a development elevation by gauging the object at a job site. This usually has to be carried out by taking dimensions of the various parts of the object with the help of such instruments as compass, straight rules, tape rule, etc. and also by the use of pencil, card board and scissors to fit the object in order to make a pattern by trial and error. The procedure is therefore tedious and time-consuming, and is less effective.

Intersection markers and templates have previously been devised in an effort to provide a practical device for making the necessary determinations and markings with minimum effort. Examples may be cited in the U.S. Pat. Nos. 2,742,706 to Rushing and 2,761,273 to Barnes. More recently, this author discloses a new and useful gauge developer in the U.S. Pat. No. 4,807,369

With a view to solve the aforesaid problems, the gauge developer, as disclosed in U.S. Pat. No. 4,807,369 and shown here in FIG. 6, includes a flexible strip 1 of soft sheet material, such as rubber, synthetic resin, etc., and a set of insertion pins 3. The strip is provided on one surface thereof along the direction of its length, equally spaced and integrally formed, with a plurality of parallel pin holder portions 2 extending in the direction of the strip breadth. The pins 3 having a length greater than the breadth of the strip are removably inserted in the pin holder portion 2 and, depending on the necessity, there may also be an adhesive layer 8 provided on the back portion of the strip 1. In this gauge developer, however, because of the pin holder portions 2 that project out on the surface of the flexible strip, it has made manufacture somewhat difficult and because of the mold, production of the density of small-pitch pin holders has also been troublesome. Furthermore, insertion pins rely only on the friction of the holder portions for securement in position, and if the hole size becomes greater than the predetermined size owing to a random difference in dimension during the production, the pins would become loose and would thus lead to displacement or even falling off of the pins whereby it results in incapability of obtaining precise development elevations or curves. At the same time, since the pin holder portions are highly protruding on the surface of the strip, if it is desired to place several strips one above the other for use as a multi-layer or stereo gauge block, or for storage in space-saving, there would be much inconvenience. Hence, the disclosed gauge developer presents certain limitations in its uses.

The present invention has for its aim to eliminate the foregoing drawbacks and carry out further innovation over the prior gauge developer.

Accordingly, one object of the present invention is to provide an improved gauge developer suitable for use at a job site in gauging section or curve of any object so as to obtain in a quick and easy way the required development elevation, contour, curve or the shape thereof.

Another object of this invention is to provide a gauge developer having both sides of the developer body formed with even surfaces and the body itself provided with magnetic substances or provided on one side thereof with a coating of magnetic sheet, wherein pin holder portions are recess holes formed by one surface thereof being caved in along the thickness direction, toward the other side where insertion pins when inserted in the holes are held in position by friction of the hole walls and magnetic force from the magnetic body or magnetic layer thereby allowing pins to be maintained in position during use.

A further object of this invention is to provide a gauge developer, several of which can be compactly placed with one above the other in a block form for use in gauging the contour or surface shape of any body having a concavoconvex surface.

In summary, the foregoing and other objects are attained by the provision of a gauge developer including a soft flexible strip having along the length direction of the strip a plurality of tubular pin holder portions which open on the same plane as the surface of the strip and which recesses are caved in from the said surface along the thickness direction of the strip toward the other side and extend along the breadth direction of the strip. In pin holder portions are removably inserted pins having a length greater than the breadth of the strip, and further on one side of the strip, usually on the reverse side of the one where openings are located, there is provided a layer of flexible or rigid magnetic sheet. In another embodiment of the present invention, the strip itself is formed by molding from materials such as synthetic resin having mixed in the interior a magnet powder whereby provision of a magnetic sheet on one side thereof can thus be omitted.

Other objects and advantages of the present invention will become apparent form the following detailed description of the preferred embodiments thereof in connection with the accompanying drawings.

DETAILED DESCRIPTION OF PREFERRED EMBODIMENT OF THE INVENTION

Figure 1:
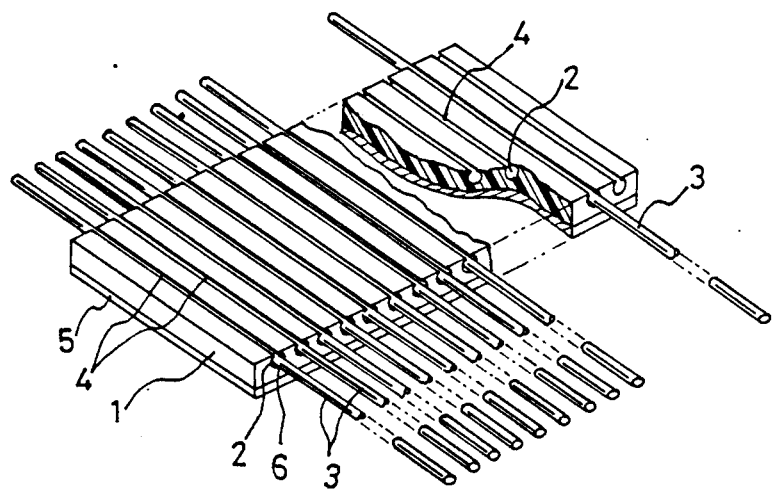
FIG. 1 is a perspective view of a first embodiment of gauge developer of the present invention with some parts thereof being partially broken away.

Referring now to FIG. 1, there is shown a gauge developer of the present invention which generally comprises a long flexible strip 1 fabricated from the elastomer of rubber and synthetic resin. On one side along the direction of the strip length, the flexible strip 1 is formed in continuity in an equally spaced and parallel way with a plurality of tubular pin holder portions 2 extending in the direction of the strip breadth. Each of the pin holder portions 2 has an opening 4 on the same plane as one surface of the strip 1 and a groove 6 extending from the surface along the thickness of strip 1 toward the other side. Through the pin holder portions 2 are removably passed, against the frictional force from the internal wall of groove 6, steel pins 3 having a length longer than the breadth of strip 1, that is, the length of groove 6. Furthermore, the strip 1 is provided on either the front side or the back side, most frequently being on the back side thereof, with a layer of flexible or even rigid magnetic sheet or plate 5.

Figure 2:
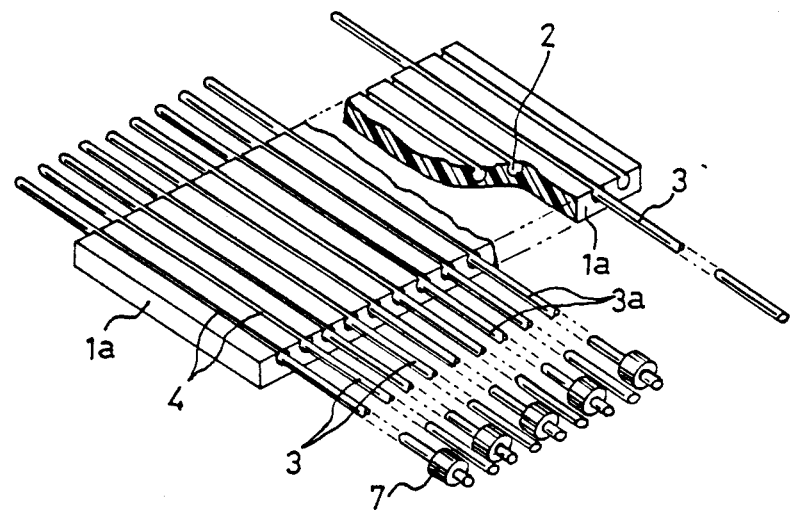
FIG. 2 is a perspective view of a second embodiment of gauge developer with some parts thereof being partially broken away.
Figure 3:
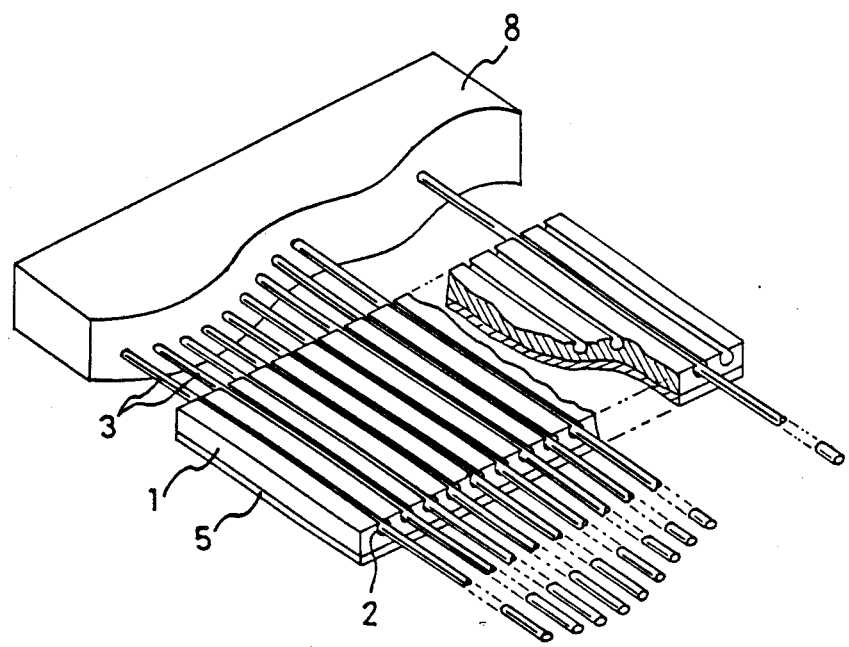
FIG. 3 illustrates one example of use of the gauge developer of the present invention, showing gauging of the curve of an object.
Figure 6:
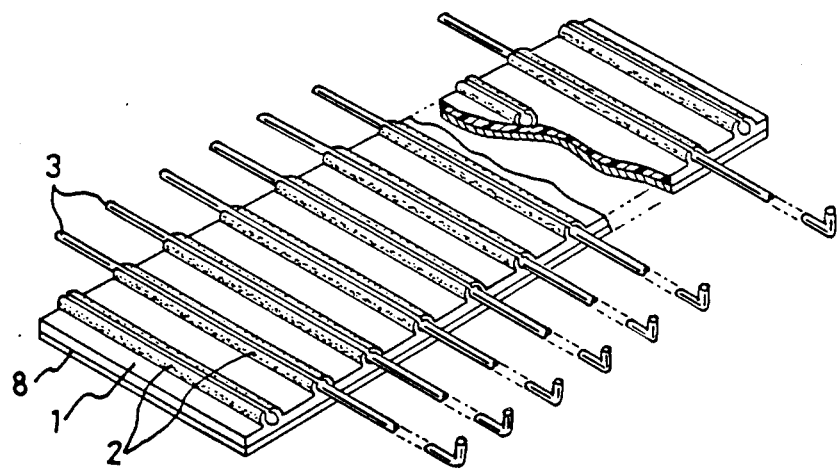
FIG. 6 is a perspective view of a prior art of the gauge developer.

A further embodiment of gauge developer of the present invention is illustrated in FIG. 2. While in the above embodiment, a magnetic sheet 5 is provided on the back side of strip 1 to confer it with a magnetic nature, in the present embodiment the strip 1a is constituted of a flexible magnetic sheet directly molded from a synthetic resin material having mixed therein a magnetic powder. Consequently, the strip 1a has a magnetic nature by itself and does not therefore require attachment on one side thereof to a magnetic sheet 5 as above described.

It will be appreciated that simple pins are obtained by cutting the elongated steel wire into appropriate lengths, and are used for the pins 3. However, it is equally possible to use pins with heads as disclosed in U.S. Pat. No. 4,807,369, or as shown in FIG. 2 wherein the pins have mounted at one end thereof cylindrical heads 7 formed by molding from a synthetic resin. In this embodiment, pins 3 and 3a are arranged in an alternate fashion as illustrated in FIG. 2, whereby the arrangement can ensure even better stability of the position of the pins 3 and 3a inside the pin holder portions and, at the same time, prevent any accidental bending of the ends that project out from the pin holders during use of the pins.

Figure 4:
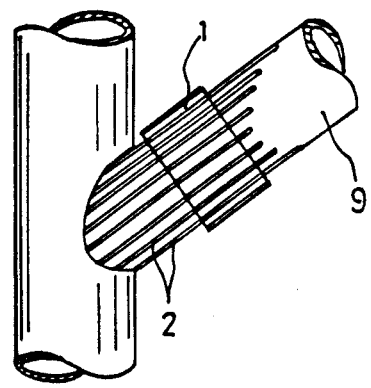
FIG. 4 illustrates a further example of use of the gauge developer in gauging the development elevation of joint portion of pipes.
Figure 5:
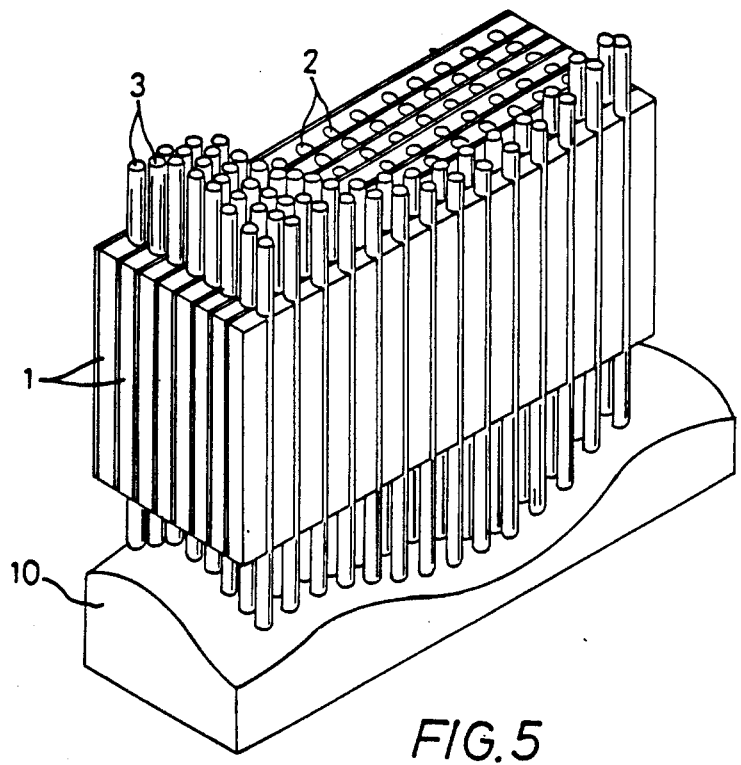
FIG. 5 illustrates the use of several of the gauge developers of the present invention being placed with one above the other as a gauge block.

In the use of gauge developer of the present invention, the developer is first closely applied by magnetic force to a steel sheet or a steel rule or any other flat surface (not shown). The pins 3 inserted in the pin holders 2 are adjusted so that one end of each pin comes into contact with the curved surface or section of an object 8 to be gauged. Thereafter, the gauge developer is laid on a sheet of paper or on a sheet-like material and spread out and, by joining all the end points of pins 3 with a writing implement a drawing of the same curve as the gauged surface of the object can thus be obtained. In piping work of ducts, pipelines, etc., to obtain, for instance, a development elevation of the joining end of two pipes as shown in FIG. 4, it is only required to roll the gauge developer over the pipe 9 and adjust the pins 3 till one end of each pin comes into contact with the joining line of the pipe joining ends. The developer is next removed from the pipe 9 and after it has been spread out on a board or a sheet of paper, all the end points of the pins 3 are connected with a writing implement and a development elevation of the joining ends of the pipes or ducts is thereby obtained. Obviously, this gauge developer can also be employed directly in the use of gauge for examination purposes to study the curve or shape of several working objects having the same shape and specification. Still again, it is possible to dispose several of the gauge developers of the present invention magnetically in an overlapping manner to each other to form a gauge block for determining the surface of a working object or a three-dimensional model 10 having irregular, uneven surfaces so as to obtain an imitation of the shape or drawing of that object. The gauge block is thereafter disintegrated piece by piece to form separate gauge developers and from which can be separately obtained shapes or drawings corresponding in position to the divided portions of the working object.

According to the present invention, by disposing the strip on a working object or rolling the strip over the object and adjusting the pins till one end of which comes into contact with the object at the determined location on the object, and next by removing from the object and spreading the strip out, it enables one to obtain a developed pattern, or a regular or even an irregular curve in a quick and easy way. Several of the gauge developer may also be disposed one on the other and by the magnetic attraction to each other to form a gauge block whereby it further enables the obtaining of the shape of an object, the profile or surface shape of a three-dimensional model and even the developed pattern and curve thereof. When used as a simple and convenient gauging means at job sites, the gauge developer of the present invention has greatly enhanced the efficiency at obtaining material and mending work on a job site and, at the same time, it may also be used for gauging the curve or the curved surfaces of various products. Hence, the gauge developer of the invention proves to be of high utility value.

I claim:

1. A gauge developer, comprising:
   a flexible strip having a substantially planar front surface and a plurality of pin holding spaces extending through said flexible strip from one side thereof to an opposite side thereof parallel to said planar front surface;
   a plurality of pins made of relatively long and thin steel wire for movable and removable insertion in respective said pin holding spaces; and
   magnetic means for magnetically attracting said plurality of pins toward respective surfaces of said plurality of pin holding spaces in said flexible strip for securing said pins therein by frictional resistance;
   wherein each said pin holding space is tubular and has an elongated opening which opens onto said substantially planar front surface of said flexible strip.

2. The gauge developer as set forth in claim 1, wherein:
   said flexible strip is a single unitary block made of a composite material.

3. The gauge developer as set forth in claim 2, wherein said composite material is an elastomer of rubber and synthetic resin.

4. The gauge developer as set forth in claim 2, wherein said magnetic means comprises magnetic material mixed in with said composite material of said flexible strip.

5. The gauge developer as set forth in claim 1, wherein:

said pin holding spaces are defined in said flexible strip entirely between said substantially planar front surface and an opposite, rear surface of said flexible strip, said rear surface also being substantially planar.

6. The gauge developer as set forth in claim 1, wherein:

said magnetic means comprises a magnetic sheet attached to one of said front side and a rear side opposite said front side.

7. The gauge developer as set forth in claim 6, wherein said magnetic sheet is attached to said rear side.

8. The gauge developer as set forth in claim 6, wherein said magnetic sheet is attached to said front side.

9. The gauge developer as set forth in claim 6, wherein said magnetic sheet is substantially rigid.

10. The gauge developer as set forth in claim 6, wherein said magnetic sheet is substantially flexible.

* * * * *